United States Patent [19]

Yoshiura et al.

[11] Patent Number: 4,959,799
[45] Date of Patent: Sep. 25, 1990

[54] INFERENCE METHOD AND SYSTEM

[75] Inventors: Hiroshi Yoshiura; Takeshi Chusho, both of Yokohama; Shoichi Masui, Kawasaki; Hideo Ohata, Machida, all of Japan

[73] Assignee: Hitachi, Ltd., Tokyo, Japan

[21] Appl. No.: 266,898

[22] Filed: Nov. 3, 1988

[30] Foreign Application Priority Data

Nov. 5, 1987 [JP] Japan .................................. 62-279878

[51] Int. Cl.⁵ ............................................ G05B 15/18
[52] U.S. Cl. .................................................... 364/513
[58] Field of Search ................ 364/200, 900, 300, 513

[56] References Cited

PUBLICATIONS

"Information Processing", Information Processing Society of Japan, vol. 26, No. 12 (1985), pp. 1487-1496.

*Primary Examiner*—Allen MacDonald
*Attorney, Agent, or Firm*—Fay, Sharpe, Beall, Fagan, Minnich & McKee

[57] ABSTRACT

In an inference machine having a knowledge set portion which stores therein a set of knowledge items such as rules, and an inference portion which interprets the rules for execution; priority level information items which set precedence degrees among the rules within the rule set are stored in a plurality of series with respect to standpoints of users, one series which meets the standpoint of a particular user is selected from among the plurality of stored series of priority level information items, and the rule of the highest precedence degree is selected on the basis of the selected series of priority level information items, with the result that the rule conforming to the standpoint of the particular user is selected and executed. On the other hand, a plurality of optimum solutions for the respective standpoints can also be found in such a way that the different series of priority level information items are successively selected, whereupon the inference portion finds the solutions for the respective selected series of priority level information items.

19 Claims, 13 Drawing Sheets

FIG. 4

| | | | | |
|---|---|---|---|---|
| IF | <WORKING-AREA-CONDITION 1><WORKING-AREA-CONDITION 2> - - - - - <WORKING-AREA-CONDITION k> | } 401 |
| THEN | <WORKING-AREA-REWRITING 1><WORKING-AREA-REWRITING 2> - - - - - <WORKING-AREA-REWRITING ℓ> | } 402 |
| | <PROCEDURE-CALL 1><PROCEDURE-CALL 2> - - - - - <PROCEDURE-CALL m> | |
| PRIORITY | <PRECEDENCE-DEGREE 1><PRECEDENCE-DEGREE 2> - - - - - <PRECEDENCE-DEGREE n> | } 403 |

FIG. 5

(
( <WORKING-AREA-CONDITION 1'><WORKING-AREA-CONDITION 2'> - - - - - <WORKING-AREA-CONDITION k'>) } 501
( <WORKING-AREA-REWRITING 1'><WORKING-AREA-REWRITING 2'> - - - - - <WORKING-AREA-REWRITING ℓ'> } 502
<PROCEDURE-CALL 1'><PROCEDURE-CALL 2'> - - - - - <PROCEDURE-CALL m'> )
( <PRECEDENCE-DEGREE 1><PRECEDENCE-DEGREE 2> - - - - - <PRECEDENCE-DEGREE n> ) } 503
)

FIG. 6

```
( $ FUNDS          30000   )           } 601
( TROUSERS                      } 607
    # KIND        CLOTHES       } 608
    # PRICE       10000         } 609   } 602
    # SELECTED    NO      )     } 610
( SHIRT 1
    # KIND        CLOTHES
    # PRICE       5000                  } 603
    # SELECTED    NO      )
( SHIRT 2
    # KIND        CLOTHES
    # PRICE       6000                  } 604
    # SELECTED    NO      )
( BOTTLE-OF-WHISKY
    # KIND        LUXURY
    # PRICE       10000                 } 605
    # SELECTED    NO      )
( RECORD
    # KIND        LUXURY
    # PRICE       3000                  } 606
    # SELECTED    NO      )
```

FIG. 7

```
IF          X# SELECTED = NO,  X# PRICE ≤ $ FUNDS     } 705  ⎤
THEN        LIST-UP (X),       X# SELECTED ← YES      } 706  } 701
            $ FUNDS ← $ FUNDS − X# PRICE
PRIORITY    1          1          2                   } 707  ⎦
IF          X# SELECTED = NO,  X# KIND = CLOTHES            ⎤
            X# PRICE ≤ $ FUNDS
THEN        LIST-UP (X),       X# SELECTED ← YES            } 702
            $ FUNDS ← $ FUNDS − X# PRICE
PRIORITY    2          3          3                         ⎦
IF          NOT (X# SELECTED = NO,                          ⎤
                 $ FUNDS − X#PRICE ≥ 10000 )
THEN        STOP                                            } 703
PRIORITY    3          2          1                         ⎦
IF          X# SELECTED = NO,                               ⎤
            $ FUNDS − X# PRICE ≥ 10000
THEN        LIST-UP (X),       X# SELECTED ← YES            } 704
            $ FUNDS ← $ FUNDS − X# PRICE
PRIORITY    3          2          1                         ⎦
```

FIG. 8

```
(  ( ×# SELECTED = NO,   ×# PRICE ≤ $ FUNDS )
   ( LIST-UP (×),        ×# SELECTED ← YES
     $ FUNDS ← $ FUNDS − ×# PRICE    )
   ( 1          1           2                  ) )    } 801

(  ( ×# SELECTED = NO,   ×# KIND = CLOTHES
     ×# PRICE ≤ $ FUNDS                       )
   ( LIST-UP (×),        ×# SELECTED ← YES
     $ FUNDS ← $ FUNDS − ×# PRICE    )
   ( 2          3           3                 ) )    } 802

(  ( NOT (×# SELECTED = NO,
          $ FUNDS − ×#PRICE ≥ 10000       ) )
   ( STOP )
   ( 3          2           1                 ) )    } 803

(  ( ×# SELECTED = NO,
     $ FUNDS − ×# PRICE ≥ 10000           )
   ( LIST-UP (×),        ×# SELECTED ← YES
     $ FUNDS ← $ FUNDS − ×# PRICE    )
   ( 3          2           1                 ) )    } 804
```

FIG. 10

IF    \<WORKING-AREA-CONDITION 1\>\<WORKING-AREA-CONDITION 2\> - - - \<WORKING-AREA-CONDITION k\> } 401

THEN \<DATA-READ 1\>\<DATA-READ 2\> - - - - - - - \<DATA-READ p\>
      \<WORKING-AREA-REWRITING 1\>\<WORKING-AREA-REWRITING 2\> - - - \<WORKING-AREA-REWRITING ℓ\>
      \<ORDER-SELECTION\>

IF    \<WORKING-AREA-CONDITION 1\>\<WORKING-AREA-CONDITION 2\> - - - \<WORKING-AREA-CONDITION k\> } 401

THEN \<WORKING-AREA-REWRITING 1\>\<WORKING-AREA-REWRITING 2\> - - - \<WORKING-AREA-REWRITING ℓ\> } 402
      \<PROCEDURE-CALL 1\>\<PROCEDURE-CALL 2\> - - - - - \<PROCEDURE-CALL m\>

CLASS \<CLASS-NAME\>

((<CLASS-NAME 11> <CLASS-NAME 12> - - - - - <CLASS-NAME $1m_1$>) ) } 1301
 (<CLASS-NAME 21> <CLASS-NAME 22> - - - - - <CLASS-NAME $2m_2$>) ) } 1302
  ...
 (<CLASS-NAME j1> <CLASS-NAME j2> - - - - - <CLASS-NAME $jm_j$>) ) } 1303
  ...
 (<CLASS-NAME n1> <CLASS-NAME n2> - - - - - <CLASS-NAME $nm_n$>) ) } 1304
)

FIG. 15

IF   <WORKING-AREA-CONDITION 1><WORKING-AREA-CONDITION 2> - - - - - - <WORKING-AREA-CONDITION k> } 401
<PRECEDENCE-ORDER-CONDITION 1><PRECEDENCE-ORDER-CONDITION 2> - - - - <PRECEDENCE-ORDER-CONDITION q> } 1501
THEN <DATA-READ 1> <DATA-READ 2> - - - - - - - <DATA-READ p>
<WORKING-AREA-REWRITING 1><WORKING-AREA-REWRITING 2> - - - - <WORKING-AREA-REWRITING ℓ> } 1001
<ORDER-SELECTION>

FIG. 17

```
( <VARIABLE-NAME>  <VARIABLE-VALUE>                                           ⎫ 17011
  ( <PRECEDENCE-DEGREE 1>  <PRECEDENCE-DEGREE 2> - - - <PRECEDENCE-DEGREE r> )⎫ 17012  ⎬ 1701

( <FRAME-NAME>
  <SLOT-NAME 1>  <SLOT-VALUE 1>
  <SLOT-NAME 2>  <SLOT-VALUE 2>
       - - -
  <SLOT-NAME n>  <SLOT-VALUE n>                                               ⎫ 17021
  ( <PRECEDENCE-DEGREE 1>  <PRECEDENCE-DEGREE 2> - - - <PRECEDENCE-DEGREE s> )⎫ 17022  ⎬ 1702
)
```

INFERENCE METHOD AND SYSTEM

BACKGROUND OF THE INVENTION

1. Field of the Invention:

The present invention relates to an inference method in an inference machine employing a set of knowledge such as rules. More particularly, it relates to an inference method and system well suited for the settlement of a problem in which rules from a plurality of standpoints are applied so as to find different solutions depending upon the standpoints.

2. Description of the Prior Art:

As stated in, for example, the bulletin "Information Processing" of the Information Processing Society of Japan, Vol. 26, No. 12 (1985), pp. 1487–1496, a prior-art inference machine is constructed of a rule set portion which stores a set of rules, an inference portion which interprets and executes the rule, and a working memory which stores the initial state and intermediate state of an inference. The inference portion infers while repeating a finding process which finds the rule executable in the current initial or intermediate state stored in the working memory, a conflict resolution process which finds the optimum rule as the rule to-be-executed in the presence of a plurality of executable rules, and an execution process which executes the rule to-be-executed thereby to compute the next intermediate state and to rewrite the working memory.

In the finding process, the plurality of executable rules are found in such cases:

(1) where a plurality of solutions are possible to a problem, so the rules corresponding to respective alternatives are executable, (2) where the rule set is redundant, and there are a plurality of lines of inference leading to an identical solution, so the rules corresponding to the respective lines are executable, and (3) where the rules to be executed in other intermediate states similar to the current intermediate state are executable in the current state.

The conflict resolution process finds the rule to-be-executed on the basis of a resolution method which is designated according to each of the aforecited cases. In the first-mentioned case, namely, the case where the plurality of executable rules have been found in correspondence with the plurality of possible solutions, a priority level method using rule ranks as stated below is employed.

The priority level method sets the precedence degrees of the rules within the rule set before or midway of the inference. By way of example, the method sets the precedence degrees according to which, among rules a, b, c, d and e, the rules a and d have the highest precedence degree, the rules b and c have the second-highest precedence degree, and the rule e has the lowest precedence degree. These items of information shall be called "priority level information." The conflict resolution process selects the rule of the highest precedence degree among the executable rules on the basis of the priority level information.

The priority level method is intended to find the optimum one of the plurality of possible solutions by appropriately setting the priority level information items. With the prior-art inference method, it has been possible to set the priority level information items in only one series.

According to the prior-art technique, the same optimum solution is found for an identical problem at all times.

In the fields of scientific and technical computations, etc., the single optimum solution has existed for one problem. However, in the field of decision making in daily life or business to which the inference machine is directed, there are problem settlements from various standpoints, and the optimum solutions of the individual standpoints can exist for one problem. By way of example, the problem of the plan of shopping involves the standpoint of saving, the standpoint of hoarding, the standpoint of lightening baggage, etc., which have the optimum solutions, respectively.

The inference machine which is truly useful for a user is an inference machine which finds the optimum solution from the user's standpoint, or an inference machine which finds the plurality of optimum solutions of various standpoints, thereby permitting the user to extensively study a problem on the basis of these solutions. As stated before, however, the conventional inference method in the prior art has been capable of finding only one optimum solution.

SUMMARY OF THE INVENTION:

The present invention has been made in view of the above circumstances, and has for its object to provide an inference method and system which eliminate the drawback of the prior-art inference method as stated above and which make it possible to find the optimum solutions from a plurality of standpoints.

In order to accomplish the object, the present invention consists, in an inference machine having knowledge set memory means for storing a set of knowledge items therein, and inference means for interpreting the knowledge items for execution, in storing a plurality of series of priority level information items which set precedence degrees among the knowledge items within the knowledge set, selecting or designating one of the plurality of series of priority level information items, and selecting one knowledge item on the basis of the priority level information series selected or designated by the selecting or designating step, in a case where a plurality of available knowledge items exist when said inference means interprets the knowledge items for execution.

Thus, according to the present invention, priority level information items in a plurality of series for respective standpoints of users are stored, one series which meets the standpoint of a particular user is selected from among the plurality of stored series of priority level information items, and the rule of the highest precedence degree with respect to the selected series of priority level information items is selected when the inference means has found a plurality of executable rules in an initial state, an intermediate state or the like, with the result that the rule conforming to the standpoint of the particular user can be selected and executed.

In this manner, the rules conforming to the standpoint of the particular user are selected in the respective intermediate states or the likes with the proceeding of inference, whereby the optimum solution from the standpoint of the particular user can be finally found. On the other hand, the different series of priority level information items are successively selected, and the inference portion finds the solutions for the respective selected series of priority level information items as stated above, whereby a plurality of optimum solutions for the respective standpoints can be found.

The foregoing and other objects, advantages, manner of operation and novel features of the present invention will be understood from the following detailed description when read in connection with the accompanying drawings.

BRIEF DESCRIPTION OF THE DRAWINGS;

FIG. 4 is a diagram showing an example of the format of a rule in the first embodiment;

FIG. 5 is a diagram showing the format of the intermediate representation of the rule in the first embodiment;

FIG. 6 is a diagram showing an example of the initial state of an inference;

FIG. 7 is a diagram showing an example of a rule set;

FIG. 8 is a diagram showing an example of the intermediate representation of the rule set;

FIG. 10 is a diagram showing an example of the format of a level determining rule in the second embodiment;

FIG. 12 is a diagram showing an example of the format of a rule in the third embodiment;

FIG. 13 is a diagram showing the format of interclass priority level information items for respective standpoints in the third embodiment;

FIG. 15 is a diagram showing an example of the format of a level determining rule in the fourth embodiment;

FIG. 17 is a diagram showing an example of the format of data in a working area in the fifth embodiment.

DETAILED DESCRIPTION OF THE PREFERRED EMBODIMENTS:

Now, embodiments of the present invention will be described in detail with reference to the drawings.

Figure 2:
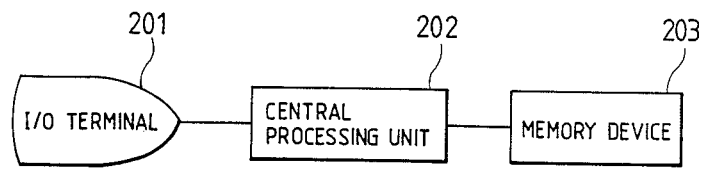
FIG. 2 is a diagram of the hardware architecture of the first embodiment.

FIG. 2 is a diagram showing the hardware architecture of an inference machine illustrative of one embodiment of the present invention. Referring to the figure, an input/output terminal 201 has the function of receiving a set of rules, an instruction for starting an inference, conflict resolution method information, priority level select information, etc., delivering the rule set and the inference start instruction to a central processing unit 202, and storing the conflict resolution method information and the priority level select information in a memory device 203; and the function of receiving a solution being an inferred result from the CPU 202, and displaying it.

In addition, the CPU 202 has the function of receiving the rule set from the I/O terminal 201, translating the rule set into rules in intermediate representation, and storing the translated rules in the memory device 203; and the function of receiving the rules in the intermediate representation from the memory device 203, interpreting and executing them, and delivering the solution to the I/O terminal 201 when the inference start instruction has been received from the I/O terminal 201.

The inference machine disclosed in this embodiment can execute a plurality of conflict resolution methods including the priority level method which uses rule ranks. The conflict resolution method is designated by the conflict resolution method information. It is the same as in the prior-art inference method that one method can be selected from among the plurality of conflict resolution methods. In a case where the conflict resolution method is the priority level method, the rule of the highest precedence degree is selected as a rule to-be-executed on the basis of a series of priority level information items selected by the priority level select information. It is the feature of this embodiment that one series can be selected from among the plurality of series of priority level information items by the priority level select information. On the other hand, in a case where the conflict resolution method is not the priority level method, the rule to be executed is selected according to the prior-art inference method.

Figure 3:
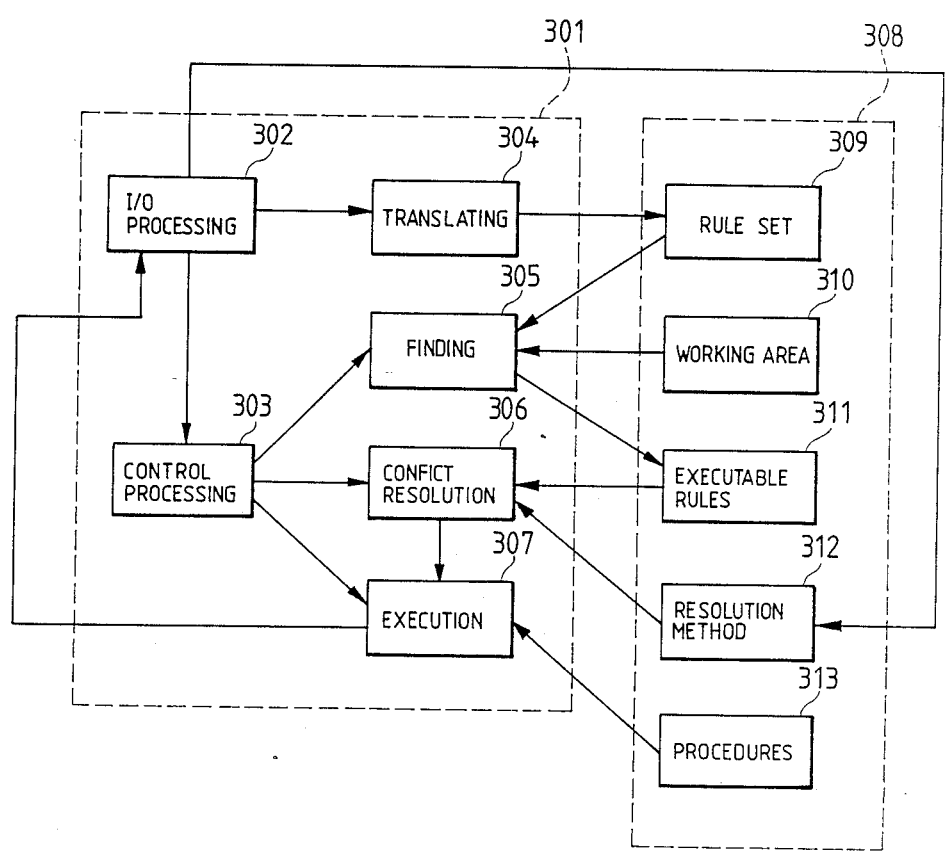
FIG. 3 is a diagram of the functional construction of the first embodiment.

FIG. 3 is a diagram showing the functional construction of this embodiment. Referring to the figure, a block 301 indicates processes or processors, which are configured of an input/output process or processor 302, a control process or processor 303, a translating process or processor 304, a finding process or processor 305, a conflict resolution process or processor 306, and an execution process or processor 307. A block 308 indicates a memory, which is configured of a rule set portion 309, a working area 310, an executable rule portion 311, a resolution method portion 312, and a procedures portion 313.

The I/O process 302 receives a set of rules, and delivers the rule set to the translating process 304. Besides, it receives conflict resolution method information and priority level select information and stores them in the resolution method portion 312. Further, it receives an instruction for starting an inference and delivers the instruction to the control process 303. On the other hand, it receives a solution from the execution process 307 and displays the solution to a user. Upon receiving the set of rules, the translating process 304 translates the respective rules into rules in intermediate representation and delivers the translated rules to the rule set portion 309.

The finding process 305 finds rules executable in a current state as stored in the working area 310, from within the set of the rules in the intermediate representation in the rule set portion 309, and it delivers the found rules to the executable rule portion 311. If the conflict resolution method information stored in the resolution method portion 312 indicates the priority level method, the conflict resolution process 306 refers to priority level information indicated by the priority level select information similarly stored in the resolution method portion 312 and selects the rule of the highest precedence degree from among the executable rules in the executable rule portion 311.

Unless the conflict resolution method information in the resolution method portion 312 indicates the priority level method, the rule to be executed is selected according to the prior-art inference method. The selected rule to be executed is delivered to the execution process 307.

The execution process 307 receives the rule to-be-executed from the conflict resolution process 306, and executes this rule. In general, an intermediate state in the working area 310 is updated and a procedure in the procedures portion 313 is called by the execution of the rule.

The rule set portion 309 stores the set of the rules in the intermediate representation. The working area 310 stores the initial and intermediate states of the inference. The initial and intermediate states are stored as the values of a variable and a frame. The updating of the intial and intermediate states as based on the execution of the rule is to rewrite the variable values and the frame values. The description of the states with the frame is the same as in the prior-art inference method, and it is detailed in, for example, the bulletin "Information Processing" of the Information Processing Society of Japan, Vol. 26, No. 12 (1985), pp. 1497-1503.

The executable rule portion 311 stores the rules which are executable in the current initial or intermediate state. In general, there are a plurality of executable rules.

The resolution method portion 312 stores the conflict resolution method information and the priority level select information as the values of variables. The conflict resolution method information is stored as the value of the variable "$ Resolution-Method." A character string indicative of a conflict resolution method is substituted in the variable "$ Resolution-Method." If the substituted character string is "Priority Level Method," it is indicated that the method of conflict resolution is the priority level method. Any of character strings indicative of other conflict resolution methods is sometimes substituted in the variable "$ Resolution-Method." The priority level select information is stored as the value of the variable "$ Level-Select." A numeral indicating which of priority level information items is to be selected is substituted in the variable "$ Level-Select."

The procedures portion 313 stores procedures described in an ordinary program language such as the C language or the Fortran language. These procedures are called when executing the rules, and are used for the display of the solution, inquiries of the user, numerical computations, etc.

As stated above, in this embodiment, the conflict resolution method information and the priority level select information are stored as the values of the variables in the resolution method portion 312. Accordingly, receiving the conflict resolution method information and the priority level select information as inputs signifies to substitute values into these variables through the I/O process 302. Owing to the substitution process, the user can designate the conflict resolution method and select the priority level information.

FIG. 4 is a diagram showing the format of the rule of this embodiment stored in the rule set portion 309. A block 401 is the condition part of the rule, which indicates those conditions on the working area 310 under which this rule is executable. Each of <working-area-condition 1>-<working-area-condition k> indicates equalities, inequalities or the negations thereof concerning the variable and frame in the working area. The finding process 305 sets as the executable rule the rule for which all the conditions <working-area-condition 1>-<working-area-condition k> hold good in the current initial or intermediate state.

In addition, a block 402 is the consequence part of the rule, in which the rewriting of states and the calling of procedures at the time of the execution of the rule are described. Each of <working-area-rewriting 1>-<working-area-rewriting 1> indicates a sentence for substituting values into the variable and frame in the working area, while each of <procedure-call 1>-<procedure-call m> indicates a sentence for calling the procedure in the procedures portion 313. The execution process 307 executes all the substitutions <working-area-rewriting> and the calls <procedure-calls> in the consequence part of the rule to-be-executed. A block 403 indicates the priority level information. <precedence-degree 1>-<precedence-degree n> denote the precedence degrees of this rule corresponding to the first - n-th series of priority level information items, respectively.

In this manner, in this embodiment, the priority level information items shall be expressed by the precedence degrees affixed to each rule. The rule of higher precedence degree has a higher priority level. By way of example, in a case where, among rules a, b, c, d and e, the precedence degrees of the rules a and d are 3, those of the rules b and c are 2 and that of the rule e is 1, the rules a and d are the most preferential, the rules b and c are subsequently preferential and the rule e is the least preferential. The priority level select information indicates which of the precedence degrees <precedence-degree 1>-<precedence-degree n> is to be used for the resolution of a conflict. That is, in case of comparing the rule a and the rule b when the value of the variable "$ Level-Select" is i, the priority <precedence-degree i> of the rule a and the priority <precedence-degree i> of the rule b are compared, and the rule whose priority <precedence-degree i> is greater is preferred.

FIG. 5 shows the format of that rule in intermediate representation which is a result obtained in such a way that the translating process 304 shown in FIG. 3 has translated the rule explained with reference to FIG. 4. Incidentally, in this embodiment, the rule in the intermediate representation shall be expressed by a list structure. A list is described by enclosing any desired number of elements with "("and")". The element of the list, per se, may well be a list. Such a nested list is expressed by further describing "("and")" within "("and")". The depth of the nesting is as desired. The rule in the intermediate representation is the intermediate representation corresponding to one rule, and the intermediate representation of the rule set is the list of the rules in the intermediate representation. By way of example, the lists of the rules in the intermediate representation are stored in the rule set portion 309 and the executable rule portion 311 in FIG. 3.

A block 501 indicates the translated result of the block 401 in FIG. 4, in which <working-area-condition 1'>-<working-area-condition k'> are the same as the aforementioned conditions <working-area-condition 1>-<working-area-condition k> or are obtained by appropriately optimalizing them, respectively. The optimalizing process is similar to the translating process in the prior-art inference method.

A block 502 indicates the translated result of the block 402 in FIG. 4, in which <working-area-rewriting 1'>-<working-area-rewriting 1'> are the same as the aforementioned substitutions <working-area-rewriting 1>-<working-area-rewriting 1> or are obtained by appropriately optimalizing them, respectively. Besides, the same applies to <procedure-call 1'>-<procedure-call m'>.

A block 503 is the translated result of the block 403 in FIG. 4, in which <precedence-degree 1>-<precedence-degree n> are the same as the aforementioned priority levels <precedence-degree 1>-<precedence-degree n>, respectively.

Figure 1:
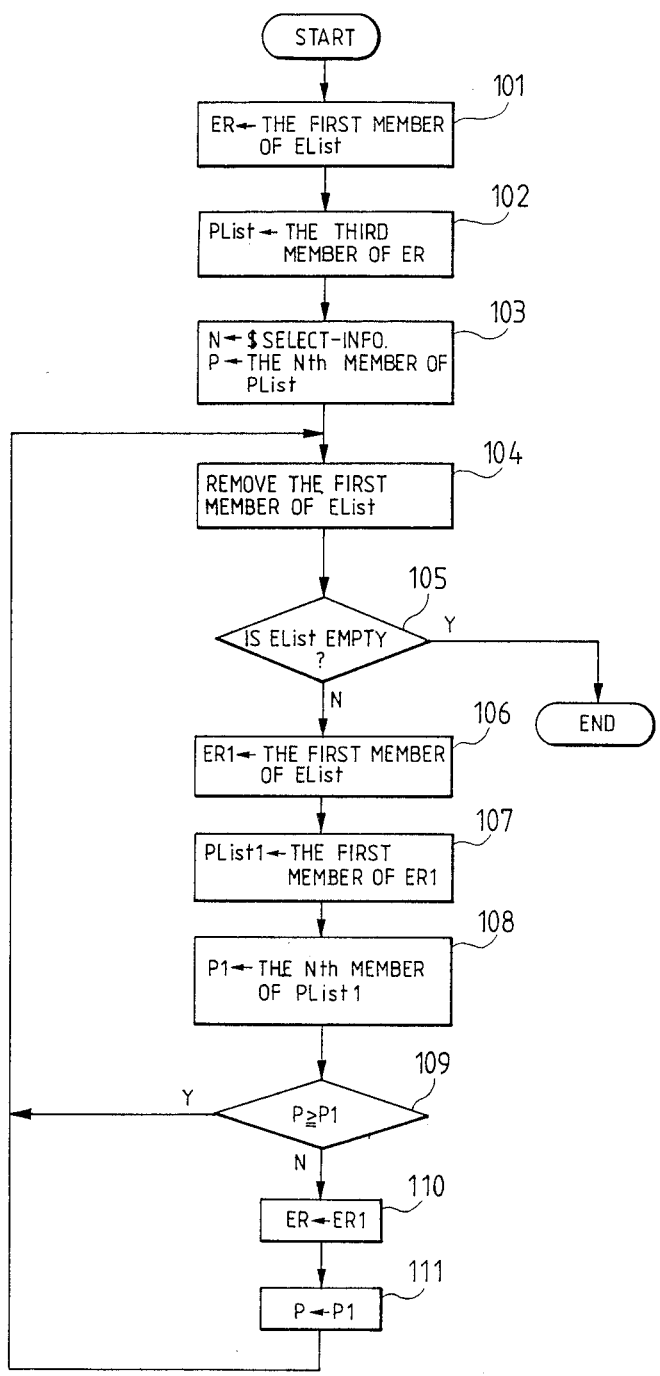
FIG. 1 is a flow chart showing the processing steps of rule selection in the first embodiment of the present invention.

FIG. 1 illustrates the operation in which the conflict resolution process 306 shown in FIG. 3 selects the rule to-be-executed from among the executable rules in the executable rule portion 311 when the conflict resolution method information in the resolution method portion 312 indicates the "priority level method", and by reference to the priority level select information that is also stored in the resolution method portion 312. It is assumed here that the executable rules are the list of the rules in the intermediate representation as explained with reference to FIG. 5 and are substituted in a variable termed "EList" (executable rule list). The priority level select information is the numeral indicating which of the precedence degrees of the block 503 shown in FIG. 5 is to be used for the conflict resolution, and it is substituted in the variable termed "$ Level-Select." By the way, in this embodiment, any variable shall be a character string which begins with "$" or an English letter.

A step 101 in FIG. 1 derives the head rule of the executable rules, and substitutes it into a variable ER (executable rules). The variable ER is a variable into which the rule to be executed is finally substituted, and the head rule is substituted thereinto at first. A step 102 derives the third member of the variable ER, namely, the list of the precedence degrees and substitutes it into a variable "PList" (precedence-degree list). The list as shown by the block 503 in FIG. 5 is substituted into the variable PList. A step 103 derives the "$ Level-Select"-th precedence degree of the list PList, and substitutes it into a variable P (precedence degree). The precedence degree of the variable ER in the series of priority level information items indicated by the priority level select information is substituted into the variable P. A step 104 removes the rule ER now derived, out of the list EList of the executable rules.

A step 105 decides if all the executable rules have been examined. In a case where they have been examined, the rule substituted in the variable ER at that time is the rule to-be-executed. In a case where they have not been examined, the precedence degrees of the rule currently substituted in the variable ER and the head rule of the list EList are compared at steps 106-111. In a case where the precedence degree of the rule currently substituted in the variable ER is greater, it is compared with that of the next rule of the list EList, and in a case where the precedence degree of the head rule of the list EList is greater, the rule ER is replaced with the head rule of the list EList.

The step 106 substitutes the head rule of the list EList into a variable ER1. The step 107 substitutes the precedence-degree list of the variable ER1 into a variable PList 1. Besides, at the step 108, the precedence degree of the variable ER1 in the series of priority level information indicated by the priority level select information is substituted into a variable P1.

At the step 109, the precedence degree of the alternative of the rule to-be-executed ER is compared with that of the head rule ER1 of the list EList. In a case where the precedence degree of the variable ER is greater or equal, the operating flow returns to the step 104, and the next rule of the list EList is compared with the variable ER. On the other hand, in a case where the precedence degree of the rule ER1 is greater, the step 110 replaces the alternative rule ER with the rule ER1, and the step 111 replaces the precedence degree P of the alternative rule ER with that P1 of the rule ER1. Thereafter, the operating flow returns to the step 104, and the next rule of the list EList is compared with the variable ER.

The above is the processing method of this embodiment.

Referring now to FIGS. 6-8, it will be elucidated that the inference machine finds a plurality of solutions from respective standpoints in accordance with the foregoing processing method. Here, a problem for forming the plan of shopping will be taken as an example. In this example, from various standpoints, commodities to be purchased are selected from within a given group of commodities.

FIG. 6 shows an initial state which is stored in the working area 310 shown in FIG. 3. A block 601 indicates that the initial value of a variable "$ Funds" expressing the amount of money in hand is 30000.

Blocks 602-606 indicate frames which express commodities, respectively. In this example, commodities to be purchased are selected from these commodities. Since the frames are realized according to the prior-art inference method, they will be described merely briefly here. The frame is data for storing the various properties of one commodity. For example, the block 602 is the frame which expresses a certain pair of trousers. A block 607 indicates that the frame expresses the trousers, a block 608 indicates that the kind of the trousers is clothes, a block 609 indicates that the price of the trousers is 10000, and a block 610 indicates that the selection of the trousers is "No," namely, that the trousers have not been selected as a commodity to-be-purchased yet.

FIG. 7 shows rules for selecting the commodity to-be-purchased. Each of blocks 701-704 indicates one rule. Marks X in each rule are variables which express any desired frame. A block 705 is the condition part of the block 701, and it denotes the condition that the frame X whose selection is "No" and whose price is smaller than the variable "$ Funds" exists in the current state. A block 706 is the consequence part of the block 701, and it denotes the action of listing up the frame X' and subtracting the amount of money "$ Funds" by the price of the frame X. The listing-up operation is a procedure for listing up commodities as articles to-be-purchased.

In this manner, the block 701 signifies that, if there is the commodity which is not selected as the article to-be-purchased yet and whose price is smaller than the funds, it is selected, whereupon the funds are reduced to the amount of the price of the commodity, and this block is the rule instructive of the purchase of any commodity which can be bought. A block 707 indicates the priority level information items of this rule.

In a case where the priority level select information is 1, that is, where the value of the information "$ Level-Select" is 1, the precedence degree is 1; in a case where the value of the information "$ Level-Select" is 2, the precedence degree is 1; and in a case where the value of the information "$ Level-Select" is 3, the precedence degree is 2.

The block 702 signifies that, if there is the commodity which is not selected as the article to-be-purchased yet, whose kind is clothes and whose price is smaller than the funds, then it is selected, whereupon the funds are reduced to the amount of the price, and this block is the rule instructive of the purchase of the clothes.

The block 703 has in its condition part the preposition that there is the commodity X which is not selected as the article to-be-purchased yet and as to which an amount of, at least, 10000 still remains even when the price of the commodity X is subtracted from the funds. In other words, the block 703 signifies to stop the inference if the funds become less than 10000 due to the purchase of any of commodities not selected yet, and it is the rule which prevents the funds from becoming less than 10000.

The block 704 signifies that, if there is the commodity X which is not selected as the article to-be-purchased yet and as to which an amount of, at least, 10000 still remains even when the price of the commodity X is subtracted from the funds, namely, if the commodity by which the funds are left at least 10000 remains, then the commodity X is selected, whereupon the funds are reduced to the amount of the price of this commodity. It is the rule instructive of the selection of the commodity within a range within which the funds do not become less than 10000. The two rules of the blocks 703 and 704 are the rules for leaving the funds at least 10000 so as to do the shopping with a margin afforded.

Now, in the case where the information "$ Level-Select" is 1, the precedence degree of the block 701 is 1, that of the block 702 is 2, that of the block 703 is 3, and that of the block 704 is 3. Therefore, the blocks 703 and 704 are the most preferential, the block 702 is subsequently preferential, and the block 701 is the least preferential. This signifies that the shopping with a margin afforded is the most preferential, that the purchase of clothes is subsequently preferential, and that the purchase of any commodities which can be bought is the least preferential. In other words, the first series of priority level information items express the standpoint that the clothes are preferentially bought within the range within which the margin is allowed.

In the case where the information "$ Level-Select" is 2, the precedence degree of the block 701 is 1, that of the block 702 is 3, that of the block 703 is 2, and that of the block 704 is 2. Therefore, the block 702 is the most preferential, the blocks 703 and 704 are subsequently preferential, and the block 701 is the least preferential. In other words, the second series of priority level information items express the standpoint that the purchase of the clothes is preferred, whereupon the shopping with the margin allowed is done.

Likewise, the third series of priority level information items express the standpoint that the purchase of the clothes is most preferred and that the clothes are bought as far as possible.

FIG. 8 shows the intermediate representation of a result obtained in such a way that the translating process 304 in FIG. 3 has translated the rules shown in FIG. 7. Blocks 801–804 indicate rules in the intermediate representation corresponding to the blocks 701–704 in FIG. 7, respectively.

Now, it will be elucidated that the finding process 305, conflict resolution process 306 and execution process 307 shown in FIG. 3 start operating from the initial state in FIG. 6 and interpret and execute the rules in the intermediate representation shown in FIG. 8 as obtained on the basis of the different sereis of priority level information items and owing to the operation indicated in FIG. 1, whereby the solutions from the different standpoints can be found.

To begin with, there will be described the case where the first series of priority level information items are selected. First, the finding process 305 finds as an executable rule a rule whose condition part is satisfied in the initial state of FIG. 6. On this occasion, a frame which satisfies the condition part is substituted into a variable X expressive of the frame in the rule. In the presence of a plurality of frames meeting the condition part, the frame described earlier is preferentially substituted. By way of example, the block 801 can satisfy its condition part no matter which of trousers, a shirt 1, a shirt 2, a bottle of whisky, and a gramophone record may be substituted into the variable X, but the pair of trousers is substituted into the variable X in accordance with the order of description. The block 802 has its condition part met by substituting the trousers, the shirt 1 or the shirt 2 into the variable X, so that the pair of trousers is substituted. The block 803 does not have its condition part held because commodities which leave the funds in the amount of, at least, 10000 remain. The block 804 has its condition part held by substituting the trousers, the shirt 1, the shirt 2, the bottle of whisky or the record, so that the pair of trousers is substituted.

After all, the block 801 in which the pair of trousers has been substituted, the block 802 in which the pair of trousers has been substituted, and the block 804 in which the pair of trousers has been substituted become the executable rules.

Next, the operation in which the conflict resolution process 306 selects the rule to-be-executed from the executable rules will be described with reference to FIG. 1. Here, the executable rule list EList is composed of the lists of the blocks 801, 802 and 804. The pair of trousers is substituted in all the variables X of the respective blocks in the list. The step 101 substitutes the first member of the list EList, namely, the block 801 into the executable rule (R. That is, the alternative of the rule to-be-executed is set to be the block 801.

The step 102 substitutes the priority level information items (1 1 2) of the block 801 into the precedence-degree list PList. The step 103 substitutes the "$ Level-Select"-th precedence degree of the list PList into the precedence degree P. Since "1" is currently substituted in the information "$ Select-Level," P=1 holds. The step 104 removes the first member of the list PList. Here, the lists of the block 802 and the block 804 are substituted into the list PList. The step 105 decides if the list PList is empty, in other words, if all the executable rules have been examined. Here, the decision is "No."

The step 106 substitutes the block 802 into the executable rule ER1. The step 107 substitutes the information items (2 3 3) into the list PList. The step 108 substitutes "2" into the precedence degree P. The step 109 compares the variables P and P1, namely, the precedence degrees of the blocks 801 and 802 in the current series of priority level information items. Here, the comparison results in "No." The step 110 replaces the variable ER with the variable ER1. The step 111 replaces the variable P with the variable P1. That is, the precedence degree of the alternative of the rule to-be-executed is replaced with the precedence degree of the block 802.

The step 104 removes the first member of the list EList, namely, the block 802. Only the list of the block 804 is substituted into the list EList. The step 105 decides that all the executable rules have not been examined. The step 106 substitutes the block 804 into the variable ER1. The step 107 substitutes the information items (3 2 1) into the list PList.

Next, the step 108 substitutes "3" into the precedence degree P. The step 109 compares the precedence degree of the block 802 and that of the block 804 in the current series of priority level information items. Here, the comparison results in "No." The step 110 replaces the alternative of the rule to-be-executed with the block 804. The step 111 replaces the precedence degree of the alternative of the rule to-be-executed with the precedence degree of the block 804.

The step 104 removes the first member of the list EList. This list EList becomes empty. The step 105 decides that all the executable rules have been examined, whereupon he processing ends. Eventually, the final value of the variable ER, namely, the block 804 becomes the rule to-be executed.

The execution process 307 executes the consequence part of the block 804. As a result, the variable $X$, namely, the pair of trousers is listed up as the article to-be-purchased. The selection of the trousers becomes "Yes," the amount of money "$ Funds" decreases by 10000 and becomes 20000, and a new intermediate state reflective of these changes is stored in the working area 310.

Next, the finding process 305 finds the executable rules under the new intermediate state. Here, the block 801 in which the shirt 1 has been substituted, the block 802 in which the shirt 1 has been substituted, and the block 804 in which the shirt 1 has been substituted become the executable rules.

Next, the conflict resolution process 306 selects the block 804 as the rule to-be-executed, and the execution process 307 lists up the gramophone record to render the selection of the record "Yes" and to bring the amount of money "$ Funds" into 12000, whereby the intermediate state is rewritten.

Next, the finding process 305 finds the executable rules under the renewed intermediate state. Here, the block 801 in which the shirt 1 has been substituted and the blocks 802 and 803 in each of which the shirt 1 has been substituted become the executable rules. The block 803 becomes executable for the reason that, whichever of the commodities not selected yet, the shirt 2 and the bottle of whisky may be purchased, the remaining amount of the funds becomes less than 10000.

Next, the conflict resolution process 306 selects the block 803 as the rule to-be-executed, and the execution process 307 executes the conseqeunce part of the block 803, whereby the inference is stopped.

Eventually, the pair of trousers, the shirt 1 and the record are listed up as the aricles to-be-purchased.

The case where the second series of priority level information items are selected, will be described below. First, the block 802 with the pair of trousers substituted therein is selected and executed, and subsequently, the block 802 with the shirt 1 substituted therein is selected and executed, so that the amount of money "$ Funds" becomes 9000. In this intermediate state, the executable rules become the blocks 801 and 803 in each of which the gramophone record is substituted. The block 803 becomes the executable rule for the reason that the funds are already less than 10000 and that, whichever of the commodities not selected yet, the bottle cf whisky and the record may be purchased, the remaining amount of the funds becomes less than 10000.

Since, in the second series of priority level information items, the precedence degree of the block 803 is greater than that of the block 801, the block 803 is selected and executed, and the inference is stopped. Eventually, the pair of trousers, the shirt 1 and the shirt 2 are listed up as the articles to-be-purchased.

The case where the third series of priority level information items are selected, will be described below. First, the block 802 with the pair of trousers substituted therein is selected and executed, and subsequently, the block 802 with the shirt 1 substituted therein is selected and executed, so that the amount of money "$ Funds" becomes 15000. Subsequently, the block 802 with the shirt 2 substituted therein is selected and executed, so that the amount of money "$ Funds" becomes 9000.

Under this intermediate state, the executable rules become the blocks 801 and 803 in each of which the record is substituted.

Since, in the third series of priority level information items, the precedence degree of the block 801 is greater than that of the block 803, the block 801 is selected and executed, and the amount of money "$ Funds" becomes 6000.

Under this intermediate state, only the block 803 forms the executable rule. Therefore, it is executed, and the inference is stopped.

Eventually, the pair of trousers, the shirt 1, the shirt 2 and the record are listed up as the articles to-be-purchased.

In this manner, when the first series of priority level information items which express the standpoint of preferntially buying clothes within a range allowing a margin are selected, the pair of trousers, shirt 1 and record are listed up; when the second series of priority level information items which express the standpoint of preferring the purchase of clothes most and then doing the shopping with a margin afforded are selected, the pair of trousers, shirt 1 and shirt 2 are listed up; and when the third series of priority level information items which express the standpoint of preferring the purchase of clothes most and buying them as far as possible are selected, the pair of trousers, shirt 1, shirt 2 and record are listed up.

Accordingly, the user can form the plan of shopping conforming to his/her standpoint, through the selection of the series of priority level information items. It is also possible that the user forms the plans of shopping from various standpoints and compares and studies them.

As thus far described, according to this embodiment, a problem can be settled from different standpoints by selecting the series of priority level information items. As a result, a user can obtain a solution conforming to his/her standpoint. Besides, the user can obtain a plurality of solutions for the different standpoints and then compare and study them.

Although, in the embodiment, it has been exemplified that the series of priority level information items are affixed to rules (refer to FIG. 4) and are selected according to information "$ Level-Select," the series of priority level information items may well be designated dialogically before the start of an inference without affixing them to the rules.

In the first embodiment described above, the value of the priority level select information, namely, the information "$ Level-Select" indicating which of the series of priority level information items is to be used has been input from the user through the I/O process 302. An embodiment to be described below will elucidate a processing method in which the priority level select information is inferred depending upon either or both of the initial or intermediate state of an inference stored in the working area 310 and input data from the user.

The hardware architecture of this embodiment is similar to that of the first embodiment described with reference to FIG. 2.

Figure 9:
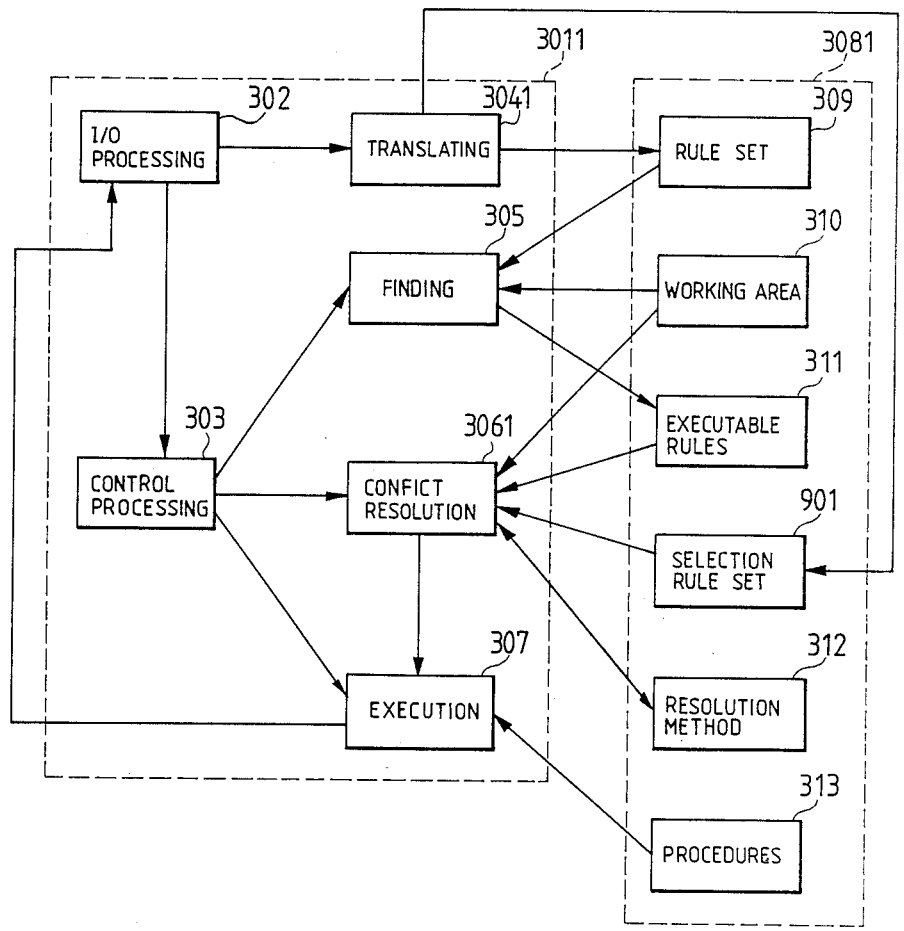
FIG. 9 is a diagram of the functional construction of the second embodiment of the present invention.

FIG. 9 shows the functional construction of this embodiment. A block 3011 indicates processing, which is configured of an input/output process 302, a control process 303, a translating process 3041, a finding process 305, a conflict resolution process 3061 and an execution process 307. A block 3081 indicates a memory, which is configured of a rule set portion 309, a working area 310, an executable rule portion 311, a level determining rule set portion 901, a resolution method portion 312 and a procedures portion 313.

In the above constituents, the I/O process 302, control process 303, finding process 305, execution process 307, rule set portion 309, working area 310, executable rule portion 311, resolution method portion 312 and procedures portion 313 are respectively similar to those explained in the first embodiment.

The translating process 3041 receives a set of rules from the I/O process 302 and translates them into rules in intermediate representation, and stores the translated rules in the rule set portion 309. In addition, the translating process 3041 similarly receives a set of level determining rules from the I/O process 302 and translates them into rules in intermediate representation, and it stores the translated rules in the level determining rule set portion 901. The translation of the level determining rules is performed by the same method as that of the translation of the ordinary rules explained in the first embodiment.

In a case where resolution method information stored in the resolution method portion 312 indicates the priority level method and where priority level select information is not fixed yet, the conflict resolution process 3061 first interprets the set of level determining rules in the level determining rule set portion 901 while referring to the working area 310. The method of the interpretation is the same as in the case of interpreting the set of ordinary rules in the rule set portion 309 as explained in the first embodiment. Herein, regarding the resolution of a conflict in the case where a plurality of level determining rules are executable at a certain time of the interpretation, the first level determining rule is executed in accordance with the order in which the level determining rules have been described. As the result of the interpretation of the set of level determining rules, the value of the priority level select information, namely, information "$ Level-Select" is substituted into the resolution method portion 312.

In contrast, in a case where the priority level select information is already fixed, that is, where a value is already substituted in the information "$ Level-Select," the interpretation of the set of level determining rules is not performed.

Subsequently, the conflict resolution process 3061 selects a rule to-be-executed from within the executable rule set portion 311, depending upon the determined value of the information "$ Level-Select" and delivers the selected rule to the execution process 307. This process is the same as in the case of the first embodiment.

By the way, in a case where the resolution method information indicates any method other than the priority level method, the resolution method in the prior art is conformed to without performing the above processes.

The level determining rule set portion 901 stores therein the set of level determining rules which serve to determine the value of the information "$ Level-Select," depending upon the initial and intermediate states of an inference stored in the working area 310 and input data from the user.

FIG. 10 shows the format of the level determining rule stored in the level determining rule set portion 901. Likewise to the block 401 in FIG. 4, a block 401 indicates those conditions concerning the working area 310 under which this level determining rule is executable. A block 1001 is the consequence part of this level determining rule.

In this block, <data-read 1>, <data-read 2>, . . . and <data-read p> denote data inputs from the user through the I/O process 302. Each of the <data-read> formulas expresses a process in which the value of a specified variable is read and is stored in the working area 310. More specifically, it expresses a process in which a prompt is given to the user by the use of the I/O process 302 so as to read data from the user, whereupon the correspondence between the name of the designated variable and the input data is stored in the working area.

Items <working-area-rewriting 1>, <working-area-rewriting 2>, . . . and <working-area-rewriting 1> are the sentences of substitution into the values of the variables and frames in the working area 310 as in the foregoing case of FIG. 4. An item <order-selection> is the sentence of substitution into the information "$ Level-Select" in the resolution method portion 312.

Each of the level determining rules need not contain all the items <data-read>, <working-area-rewriting> and <order-selection>, but it may contain at least one of them. When the level determining rule containing the item <order-selection> is executed, the interpretation of the set of level determining rules ends.

Owing to the level determining rule and the conflict resolution process employing it as described in this embodiment, the inference machine can determine the priority level select information, depending upon the initial and intermediate states of the inference stored in the working area and the input data from the user, and then carry forward the inference on the basis of the series of priority level information items indicated by the determined priority level select information. Accordingly, when a plurality of series of priority levels are previously set for the respective standpoints of the settlement of a problem, it is permitted by this embodiment that the standpoint of the user is inferred while inquiring of the user in accordance with the situation of the inference, and that a solution conforming to the user's standpoint is found on the basis of the corresponding series of priority level information items.

In the embodiment thus far described, the priority level information items have directly designated the priority levels among the rules. In contrast, an embodiment to be described below elucidates a method in which a rule set is divided into a plurality of classes beforehand, priority level information items designate the levels among the classes instead of the levels among rules, and the rule belonging to the class of highest precedence degree is executed.

The hardware architecture of this embodiment is similar to that of the first embodiment.

Figure 11:
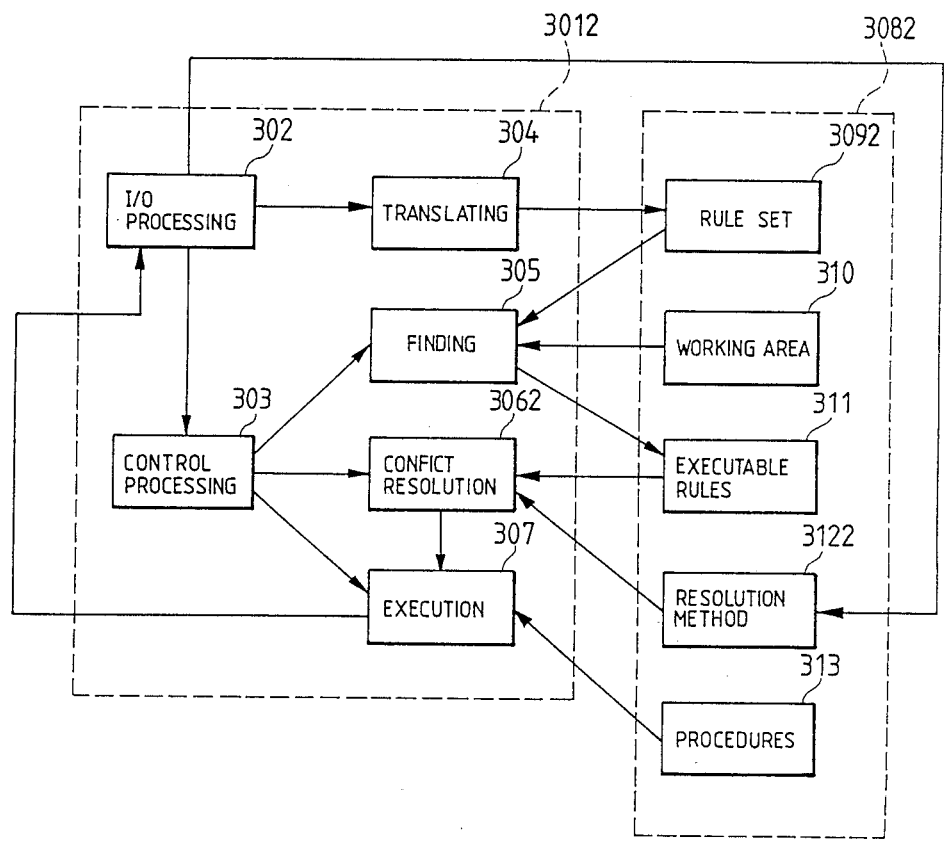
FIG. 11 is a diagram of the functional construction of the third embodiment of the present invention.

FIG. 11 shows the functional construction of this embodiment. A block 3012 indicates processing, which is configured of an input/output process 302, a control process 303, a translating process 304, a finding process 305, a conflict resolution process 3062 and an execution process 307. A block 3082 indicates a memory, which is configured of a rule set portion 3092, a working area 310, an executable rule portion 311, a resolution method portion 3122 and a procedures portion 313.

In the above constituents, the I/O process 302, control process 303, translating process 304, finding process 305, execution process 307, working area 310, executable rule portion 311 and procedures portion 313 are respectively the same as those explained in the first embodiment.

In the presence of a plurality of executable rules in the executable rule portion 311, the conflict resolution process 3062 fetches the value of priority level select information, namely, information "$ Level-Select" stored in the resolution method portion 3122. Subsequently, it fetches interclass priority levels corresponding to this priority level select information, also from the resolution method portion 3122. Subsequently, if the rule belonging to the highest-precedence-degree class in this interclass priority level series is contained in the set of executable rules, the process 3062 sets this rule as a rule to-be-executed. If the rule belonging to the class of the highest precedence degree is not contained in the set of executable rules, the rule belonging to the class of the second-highest precedence degree is searched for in the set of executable rules. Similar processes are repeated until the rule to-be-executed is found. In a case where a plurality of rules belonging to the class in search exist in the executable rules, the first rule is set as the rule to-be-executed in accordance with the order in which the rules have been described. After determining the rule to-be-executed, the process 3062 delivers it to the execution process 307.

The rule set portion 3092 stores a set of rules as in the case of the first embodiment. However, this embodiment differs from the first embodiment in that the name of the class to which each rule belongs is affixed to the rule. The details of the rule will be described later with reference to FIG. 12.

The resolution method portion 3122 stores therein at least one series of interclass priority level information items, besides the resolution method information and the priority level select information described in the first embodiment. The interclass priority level information will be described in detail later with reference to FIG. 13.

FIG. 12 shows the format of each rule in this embodiment. Blocks 401 and 402 are the same as in the first embodiment. A block 1201 indicates the name of the class to which this rule belongs.

FIG. 13 shows the plurality of series of interclass priority level information items which are stored in the resolution method portion 3122. Each of blocks 1301–1304 denotes one series of interclass priority level information items. For example, the block 1303 expresses that a class indicated by <class-name j1> is the most preferential, that a class indicated by <class-name j2> is subsequently preferential, and that a class indicated by <class-name jmj> has the lowest precedence degree. The conflict resolution process 3062 selects the interclass priority level information series in accordance with the value of the priority level select information, namely, information "$ Level-Select." By way of example, if the value of the information "$ Level-Select" is j, the j-th interclass priority level information series is selected. On the basis of the selected series of interclass priority level information items, the conflict resolution process 3062 determines a rule to-be-executed within a set of executable rules as described before.

According to the format of each rule, the interclass priority level information, and the operation of the conflict resolution process as explained in this embodiment, the class to which the rule belongs is designated, one series is selected from the plurality of preset series of interclass priority level information items, and the conflict of the rules is resolved on the basis of the selected series of interclass priority level information items, whereby the optimum solution of each standpoint can be solved as in the first embodiment.

In the foregoing embodiments, the rules to be inferred have been of one kind. An embodiment to be now described will elucidate a method in an inference machine using a plurality of groups of rules properly, in which a plurality of series of priority level information items among rules are set for each of the rule groups, one priority level information series is selected from among the plurality of series, and an inference is carried forward on the basis of the selected priority level information series.

The hardware architecture of this embodiment is similar to that of the first embodiment.

Figure 14:
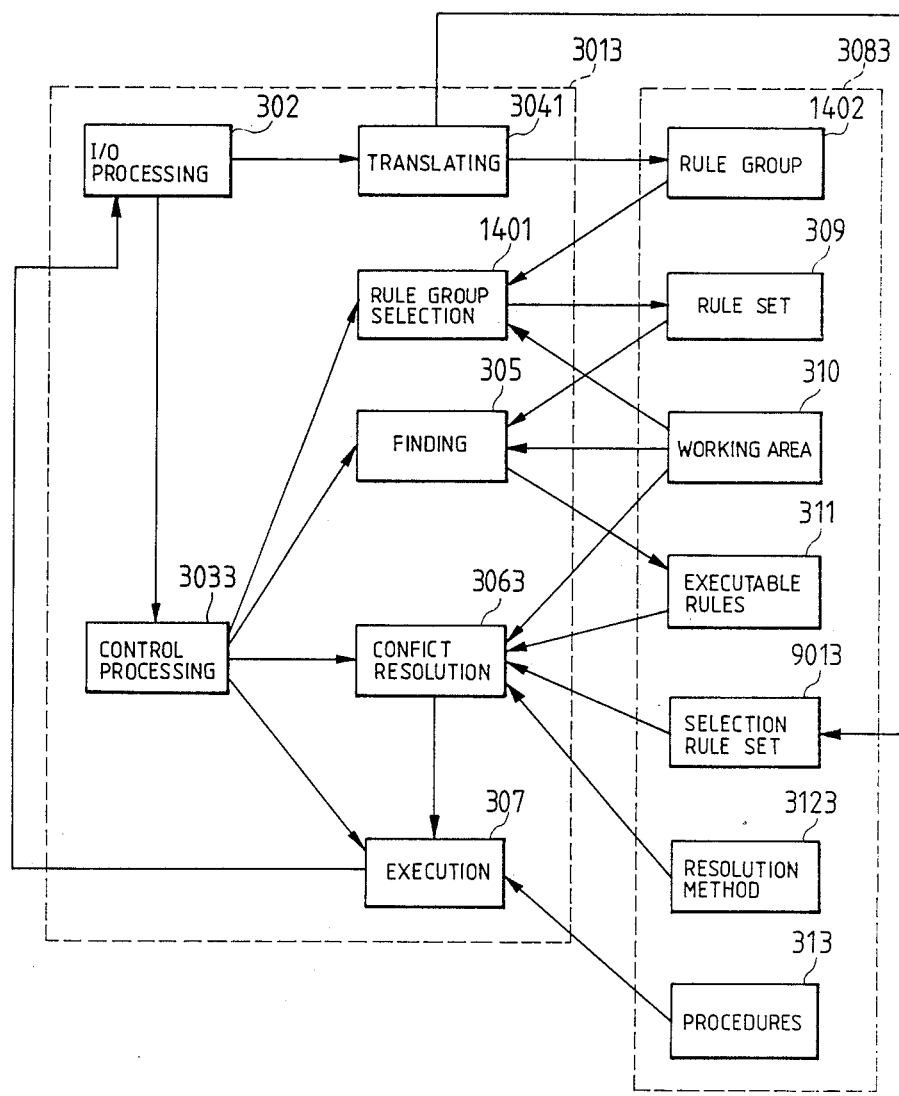
FIG. 14 is a diagram of the functional construction of the fourth embodiment of the present invention.

FIG. 14 shows the functional construction of this embodiment. A block 3013 indicates processing, which is configured of an input/output process 302, a control process 3033, a translating process 3041, a rule group selection process 1401, a finding process 305, a conflict resolution process 3063 and an execution process 307. A block 3083 indicates a memory, which is configured of a rule group set portion 1402, a rule set portion 309, a working area 310, an executable rule portion 311, a selection rule set portion 9013, a resolution method portion 3123 and a procedures portion 313.

In the above constituents, the I/O process 302, finding process 305, execution process 307, rule set portion 309, working area 310, executable rule portion 311 and procedures portion 313 are respectively the same as those explained in the first embodiment. The translating process 3041 is the same as that of the second embodiment.

The control process 3033 first starts the rule group selection process 1401, to select a rule group for use in the initial phase of the settlement of a problem and store the selected rule group in the rule set portion 309. Subsequently, the control process 3033 starts the finding process 305, conflict resolution process 3063 and execution process 307 repeatedly so as to carry forward an inference, while with the proceeding of the phases of the problem settlement, it starts the rule group selection process 1401 so as to change-over rule groups to-be-interpreted.

The rule group selection process 1401 selects the rule group suitable for the phase of the problem settlement from among a plurality of rule groups stored in the rule group portion 1402, according to the situation of the working area 310, and stores the selected rule group in the rule set portion 309.

The control process 3033 described above and the proper uses of the plurality of rule groups based on the rule group selection process 1401 have been realized by a known inference method, and a processing method is detailed in, for example, "Computing Surveys," Association for Computing Machinery (1980), pp. 213-253.

In a case where conflict resolution method information stored in the resolution method portion 3123 indicates the priority level method and where priority level select information on the rule group being currently processed is not fixed yet, the conflict resoltuion process 3063 first interprets a set of level determining rules or order selection rules in the selection rule set portion 9013. The method of the interpretation is similar to the method of interpreting the set of ordinary rules in the rule set portion 309 as described in the first embodiment. However, regarding the resolution of a conflict in the case where a plurality of order selection rules are executable at a certain point of time of the interpretation, the first order selection rule is executed in accordance with the order in which the order selection rules have been described. As the result of the interpretation of the selection rule set, the priority level select information on the rule group being currently processed is substituted into the resolution method portion 312.

In contrast, in a case where the priority level select information on the rule group being currently processed is already fixed, the interpretation of the set of order selection rules is not performed.

Subsequently, the conflict resolution process 3063 selects a rule to-be-executed from within the executable rule portion 311, depending upon the priority level select information on the rule group being currently processed, and then delivers the selected rule to the execution process 307. This process is the same as in the case of the first embodiment.

In a case where the conflict resolution method is any method other that the priority level method, the prior-art resolution method is conformed to without performing the above processes.

The rule group portion 1402 stores therein a plurality of groups of rules. The selection rule set portion 9013 stores therein the set of level determining rules or order selection rules which serve to determine the priority level information on the designated rule group, depending upon the initial and intermediate states of the inference as stored in the working area 310 and input data from a user.

The resolution method portion 3123 stores therein the conflict resolution method information, and the priority level select information items of each of the rule groups.

FIG. 15 shows the format of the order selection rule in this embodiment. A block 401 is the same as in the first embodiment.

A block 1501 indicates condition expressions concerning the priority level select information items of the rule groups which are not being currently processed. Each item <priority-level-condition> is the condition expression which requires that the priority level select information of a specified rule group is specified No. By way of example, it is the condition expression that the priority level information of rule-group-1 is 2. As described before, the selection of the priority level corresponds to the selection of the standpoint of the problem settlement. Owing to this block, in determining the priority level select information of the rule group which is being currently processed, the priority level select information items of the rule groups which are not being currently processed can be referred to. That is, the standpoint in the case of interpreting the rule group being currently processed can be determined, depending upon the standpoints in the cases of interpreting the other rule groups. As a result, the standpoints of the problem settlement can be made consistent among the rule groups.

A block 1001 is the same as the block 1001 explained in the second embodiment.

According to the functional construction, the order selection rules and the operation of the conflict resolution process as described in this embodiment, in the inference machine which properly uses the plurality of rule groups, it becomes possible that the plurality of series of priority level information items are set for each of the rule groups, that one priority level information series is selected for each rule group, depending upon the situation of the inference and the input data from the user, and that the inference is carried forward on the basis of the selected series. Moreover, the selection of the priority level information can be made consistent among the rule groups. As a result, the inference machine which properly uses the plurality of rule groups is permitted to infer the user's standpoint while inquiring of the user and to find a solution conforming to this standpoint.

In the preceding embodiment, the method of the conflict resolution for the individual standpoints concerning the rules has been described. Ar embodiment to be described below will elucidate a method of conflict resolution for individual standpoints concerning data to which rules refer.

The hardware architecture of this embodiment is similar to that of the first embodiment, and is as shown in FIG. 2.

Figure 16:
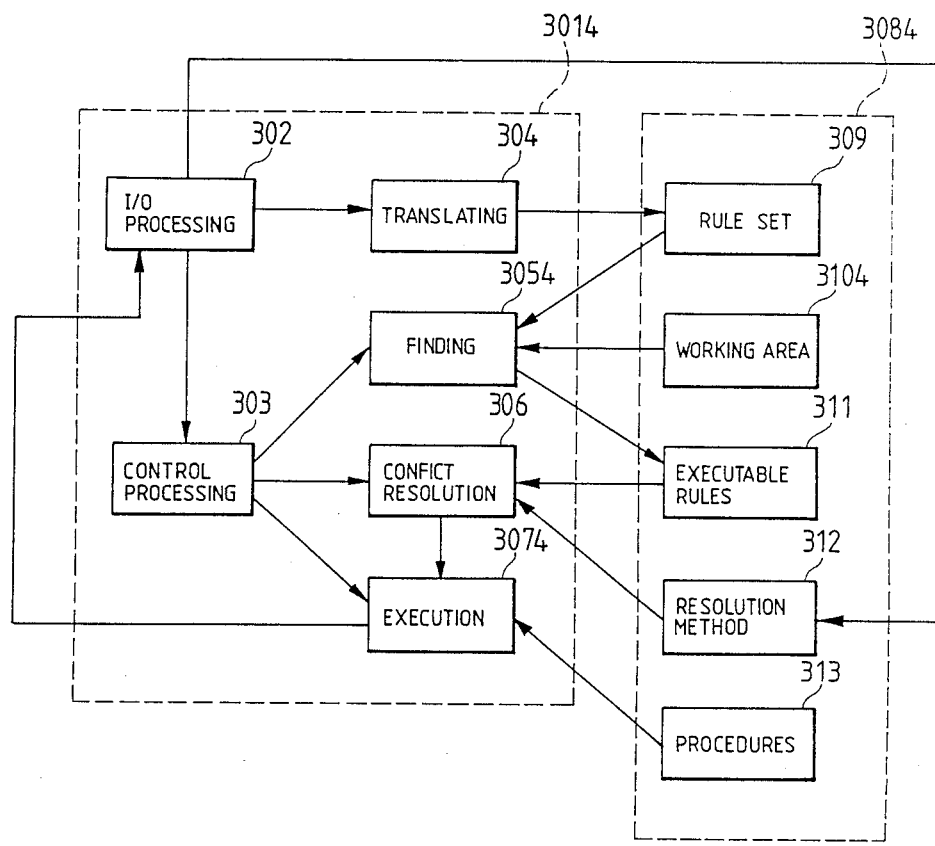
FIG. 16 is a diagram of the functional construction of the fifth embodiment of the present invention.

FIG. 16 shows the functional construction of this embodiment. A block 3014 indicates processing, which is configured of an input/output process 302, a control process 303, a translating process 304, a finding process 3054, a conflict resolution process 306 and an execution process 3074. A block 3084 indicates a memory, which is configured of a rule set portion 309, a working area 3104, an executable rule portion 311, a resolution method portion 312 and a procedures portion 313.

In the above constituents, the I/O process 302, control process 303, translating process 304, conflict resolution process 306, rule set portion 309, executable rule portion 311, resolution method portion 312 and procedures portion 313 are respectively the same as those described in the first embodiment.

The working area 3104 stores therein two sorts of data, namely, the correspondence lists between variables and variable values, and frames.

FIG. 17 shows the formats of the correspondence list between the variable and its value and the frame as stored in the working area 3104. A block 1701 indicates the correspondence list between the variable and its value. A block 17011 is a part which indicates the correspondence between the variable and its value, and which is the same as in the first embodiment. A block 17012 designates a plurality of precedence degrees of this correspondence list for each standpoint.

A block 1702 indicates the format of the frame. A block 17021 denotes the format of the frame in the prior art, which is the same as in the first embodiment. A block 17022 designates a plurality of precedence degrees of this frame for each standpoint.

In order to describe an operation peculiar to the finding process 3054 of this embodiment, the general operation of the finding process will be first outlined. The finding process selects a rule executable in a situation indicated by the working area, from within the rule set portion. More specifically, this process checks as to each rule in the rule set portion, if the condition parts thereof agree with data in the working area, that is, if the condition parts hold. Regarding the rule whose condition parts hold, the process substitutes data values in the working area into the variables in the rule and thereafter stores this rule in the executable rule portion 311. As explained in the first embodiment, the condition parts of the rule are equalities and inequalities concerning the variables and frames in the working memory. The equalities and inequalities contain two types of reference to the data in the working memory. One of the two types is the reference based on a variable name or on the combination between a frame name and a slot name, and it includes, for example, "$ Funds" and "Trousers #Kind." This indicates to fetch the value of the variable or frame of the designated name. The other type is the reference based on the combination between the variable and the slot name, and it includes, for example, "X #Price." This indicates to substitute an appropriate frame name into the variable. The finding process in the prior art performs the first type of the reference to the data in the condition part of the rule, to fetch the variable value and frame value, and thereafter performs the reference of the second type so that the condition part may hold. That is, the frame name with which the condition part holds is substituted into the variable in the condition part. By way of example, in a case where the condition part 705 of the rule 701 in FIG. 7 is decided under the situation of the working area shown in FIG. 6, the information "$ Funds" is first referred to, to fetch the value 30000, whereupon the frame name is substituted into the variable X so as to satisfy the conditions "X #Selection=No" and "X #Price<30000." On this occasion, the pair of trousers, shirt 1, shirt 2, bottle of whisky, and gramophone record can be substituted, and one frame name is selected and substituted by the appropriate conflict resolution process.

As understood from the above, two sorts of conflicts can occur in the finding process. One of the sorts is a case where a plurality of variables have an identical name in the working area or a case where a plurality of frames have an identical name or where their slits have an identical name, that is, it is the collision of the name. The other sort is a case where a plurality of frame names which can be substituted into the variable in the condition part of the rule exist in the working area. In the prior-art inference machine, the first conflict has been regarded as the error of knowledge. As to the second conflict, one precedence degree has been set for each frame, and among the frame names substitutable into the variable, the name of the frame of the highest precedence degree has been substituted.

In this embodiment, as elucidated in FIG. 17, a plurality of kinds of precedence degrees for each standpoint are set for each variable and frame. Using them, the conflict resolution process 3054 of this embodiment performs the following operation: First, the priority level select information is fetched from the resolution method portion 312. Subsequently, whether or not the condition part of the rule holds is decided. In a case where the conflict of data as stated above has occurred in the course, one of the plurality of kinds of precedence degrees set for the each data item corresponding to the priority level select information, is fetched, and the data item whose precedence degree is the highest in the fetched kind of precedence degrees is selected. By way of example, in a case where the priority level select information is 2, the data item whose precedence degree is the highest in the second kind of precedence degrees is selected among the conflicting data items.

In the execution process 3074, a similar conflict resolution is performed. The execution process substitutes the values of the variables and frames described in the consequence part of the rule. In the course, the collision of the name as in the case of the finding process can occur. To cope with this collision, as in the case of the finding process, the execution process fetches the priority level select information from the resolution method portion 312 and selects: a data item whose precedence degree of the kind corresponding to the priority level select information is the highest is selected from among conflicting data items.

According to the format of data in the working area and the operations of the finding process and the execution process as described in the above embodiment, it becomes possible that the plurality of series of priority level information items are set for the data to which the inference machine refers, that one of the plurality of series of priority level information items is selected, and that the inference is carried forward on the basis of the selected series of priority level information items. Accordingly, when the plurality of series of priority level information items are set for the data every standpoint of the problem settlement, the optimum solution of each standpoint can be found.

Now, there will be described an embodiment of a method in which, in an expert system, a solution conforming to the standpoint of a user or solutions for respective standpoints is/area found.

The expert system can be realized by inputting rules to an inference machine. Accordingly, the architecture and processing method of this embodiment are similar to those of the first embodiment concerning the inference machine, except the point that the rules are input beforehand. In other words, this embodiment can be realized by the methods described with reference to FIGS. 1–5.

According to this embodiment, the expert system is permitted to find the solution conforming to the user's standpoint or the solutions of the respective standpoints.

As described above, according to the present invention, an inference machine having a rule set memory portion for storing a set of rules therein, an inference portion for interpreting the rules for execution, and a working memory for storing an initial state and an intermediate state of an inference therein; is constructed so as to comprise the step of storing a plurality of series of priority level information items which set precedence degrees among the rules within the rule set, the step of selecting or designating one of the plurality of series of priority level information items, and the step of selecting one rule on the basis of the priority level information series selected or designated by the selecting or designating step, in a case where a plurality of executable rules exist when said inference portion interprets the rules for execution. Therefore, the invention achieves the remarkable effect that an inference method which makes it possible to find the optimum solutions for a plurality of standpoints can be realized.

We claim:

1. In an inference machine having knowledge set memory means for storing a set of knowledge items therein, and inference means for interpreting the knowledge items for execution, an inference method comprising the steps of:
- (a) storing a plurality of series of priority level information items which set precedence degrees among the knowledge items within the knowledge set;
- (b) designating one of the plurality of series of priority level information items; and
- (c) selecting one knowledge item on the basis of the priority level information series designated by the designating step, in a case where a plurality of available knowledge items exist when said inference means interprets the knowledge items for execution.

2. The inference method as defined in claim 1, wherein said step of selecting or designating one of the plurality of series of priority level information items includes the step of selecting or designating one of said plurality of series of priority level information items, depending upon an initial state of an inference or a data input from a user or upon an intermediate state of the inference or a data input from the user.

3. The inference method as defined in claim 2, further comprising:
- a step of storing in a level determining rule set-memory means a set of level determining rules for said selecting or designating one of the plurality of series of priority level information items, depending upon said initial state of the inference or the data input from the user or upon the intermediate state of the inference or the data input from the users, and said step of selecting or designating one of the plurality of series of priority level information items interpret said level determining rule set according to which to select or designate said series of priority level information items.

4. The inference method as defined in claim 1, wherein said case where the plurality of available knowledge items exist is a case in an initial state or intermediate state of inference.

5. In an inference machine having rule set memory means for storing a set of rules therein, and inference means for interpreting the rules for execution, an inference method comprising the steps of:
- (a) storing a plurality of series of priority level information items which are precedence degrees among the rules within the rule set;
- (b) designating one of the plurality of series of priority level information items; and
- (c) selecting one rule on the basis of the priority level information series designated by the designating step, in a case where a plurality of executable rules exist when said inference means interprets the rules for execution.

6. The inference method as defined in claim 5, wherein said case where the plurality of executable rules exist is a case in an initial state or an intermediate state of an inference.

7. In an inference machine having rule set memory mans for storing a set of rules therein, and inference means for interpreting the rule set for execution, an inference method comprising the steps of:
- (a) storing a plurality of series of priority level information items for setting precedence degrees among data items which can be referred to by said inference means
- (b) selecting or designating one of the plurality of series of priority level information items; and
- (c) selecting one data item on the basis of the priority level information series selected or designated by the selecting or designating step, in a case where a plurality of data items which can be referred to exist when said inference means interprets the rule set for execution.

8. The inference method as defined in claim 7, wherein said step of selecting or designating one of the plurality of series of priority level information items includes the step of selecting or designating one of said plurality of series of priority level information items, depending upon an initial state of an inference or a data input from a user or upon an intermediate state of the inference or a data input from the user.

9. The inference method as defined in claim 8, further comprising a step of:
- storing in a level determining rule set-memory means a set of level determining rules for said selecting or designating one of the plurality of series of priority level information items, depending upon said initial state of the inference or the data input from the user or upon the intermediate state of the inference or the data input from the user, and said step of selecting or designating one of the plurality of series of priority level information items interpret said level determining rule set according to which to select or designate said series of priority level information items.

10. In an inference machine having knowledge set memory means for storing a set of knowledge items therein, and inference means for interpreting the knowledge items for execution, an inference method comprising the steps of:
- (a) designating classes to which the knowledge items belong;
- (b) storing a plurality of series of priority level information items which set precedence degrees among the classes;
- (c) selecting or designating one of the plurality of series of priority level information items; and
- (d) selecting one knowledge item which belongs to the class of highest precedence degree with respect to the priority level information series selected or designated by the selecting or designating step, in a case where a plurality of available knowledge items exist when said inference means interprets the knowledge items for execution.

11. In an inference machine having knowledge set memory means for storing a plurality of sets of knowledge items therein, and inference means for interpreting the knowledge sets for execution, an inference method comprising the steps of:
- (a) storing a plurality of series of priority level information items which set precedence degrees among the knowledge items within each knowledge set, for at least one of the plurality of knowledge sets;
- (b) selecting or designating one of the plurality of series of priority level information items, for said each knowledge set to which said plurality of series of priority level information items have been given; and
- (c) selecting one knowledge item on the basis of the priority level information series selected or designated by the selecting or designating step, in a case where a plurality of available knowledge items exist when said inference means interprets each knowledge set for execution.

12. In an inference machine having knowledge set memory means for storing a set of knowledge items therein, and inference means for interpreting the knowledge items for execution, an inference method comprising the steps o:
(a) designating classes to which the knowledge items belong;
(b) storing a plurality of series of priority level information items which set precedence degrees among the classes;
(c) selecting or designating one of the plurality of series of priority level information items; and
(d) selecting one knowledge item which belongs to the class of highest precedence degree with respect to the priority level information series selected or designated by the selecting or designating step, in a case where a plurality of available knowledge items exist when said inference means interprets the knowledge items for execution.

13. In an expert system having a set of knowledge items, knowledge set memory means for storing the set of knowledge items therein, and inference means for interpreting the knowledge items for execution, an inference method comprising the steps of:
(a) storing a plurality of series of priority level information items which set precedence degrees among the knowledge items within the knowledge set;
(b) selecting or designating one of the plurality of series of priority level information items; and
(c) selecting one knowledge item on the basis of the priority level information series selected or designated by the selecting or designating step, in a case where a plurality of knowledge items available for an inference exist when said inference means interprets the knowledge items for execution.

14. In an inference machine having knowledge set memory means for storing a set of knowledge items therein, an inference means for interpreting the knowledge items for execution, an inference system comprising:
means for storing a plurality of series of priority level information items which set precedence degrees among the knowledge items within the knowledge set;
means for designating one of the plurality of series of priority level information items; and
means for selecting one knowledge item on the basis of the priority level information series designated by the designating means, in a case where a plurality of available knowledge items exist when said inference means interprets the knowledge items for execution.

15. In an inference machine having rule set memory means for storing a set of rules therein, and inference means for interpreting the rules for execution, an inference system comprising:
means for storing a plurality of series of priority level information items which sets precedence degrees among the rules within the rule set;
means for designating one of the plurality of series of priority level information items; and
means for selecting one rule on the basis of the priority level information series designated by the designating means, in a case where a plurality of executable rules exist when said inference means interprets the rules for execution.

16. In an inference machine having rule set memory means for storing a set of rules therein, and inference means for interpreting the rule set for execution, an inference system comprising:
means for storing a plurality of series of priority level information items for setting precedence degrees among data items which can be referred to by said inference means;
means for selecting or designating one of the plurality of series of priority level information items; and
means for selecting one data item on the basis of the priority level information series selected or designated by the selecting or designating means, in a case where a plurality of data items which can be referred to exist when said inference means interprets the rule set for execution.

17. In an inference machine having knowledge set memory means for storing a set of knowledge items therein, and inference means for interpreting the knowledge items for execution, an inference system comprising:
means for designating classes to which the knowledge items belong;
means for storing a plurality of series of priority level information items, which set precedence degrees among the classes;
means for selecting or designating one of the plurality of series of priority level information items; and
means for selecting one knowledge item which belongs to the class of highest precedence degree with respect to the priority level information series selected or designated by the selecting or designating means, in a case where a plurality of available knowledge items exist when said inference means interprets the knowledge items for execution.

18. In an inference machine having knowledge set memory means for storing a plurality of sets of knowledge items therein, and inference means for interpreting the knowledge sets for execution, an inference system comprising:
means for storing a plurality of series of priority level information items which set precedence degrees among the knowledge items within each knowledge set, for at least one of the plurality of knowledge sets;
means for selecting or designating one of the plurality of series of priority level information items, for said each knowledge set to which said plurality of series of priority level information items have been given; and
means for selecting one knowledge item on the basis of the priority level information series selected or designated by the selecting or designating means, in a case where a plurality of available knowledge items exist when said inference means interprets said each knowledge set for execution.

19. In an expert system having a set of knowledge items, knowledge set memory means for storing the set of knowledge items therein, and inference means for interpreting the knowledge items for execution, an inference system comprising:
means for storing a plurality of series of priority level information items which set precedence degrees among the knowledge items within the knowledge set;
means for selecting or designating one of the plurality of series of priority level information items; and
means for selecting one knowledge item on the basis of the priority level information series selected or designated by the selecting or designating means, in a case where a plurality of available knowledge items exist when said inference means interprets the knowledge items for execution.

* * * * *